Figure 1:
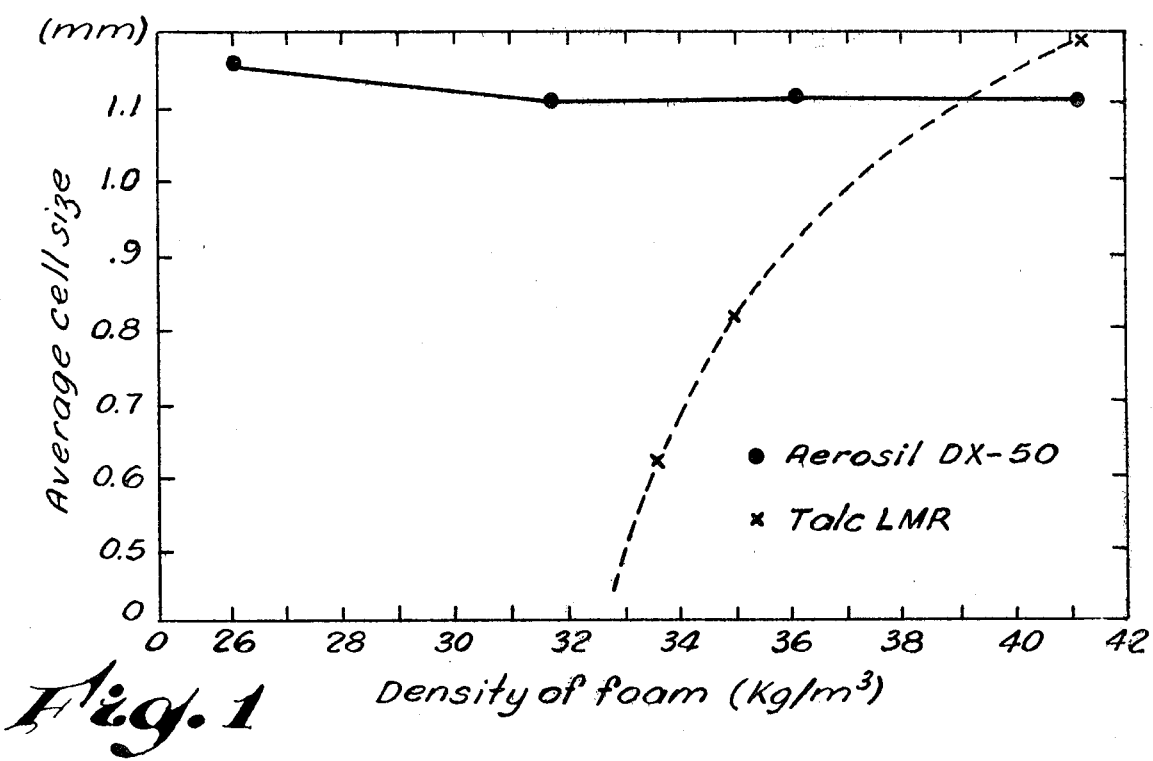

United States Patent [19]

Watanabe et al.

[11] 4,317,888
[45] Mar. 2, 1982

[54] PROCESS FOR MANUFACTURING AN OLEFIN RESIN FOAM

[75] Inventors: Seizaburo Watanabe, Tokyo; Tsukasa Yamagishi, Suzuka, both of Japan

[73] Assignee: Asahi-Dow Limited, Tokyo, Japan

[21] Appl. No.: 144,736

[22] Filed: Apr. 28, 1980

[51] Int. Cl.³ .............................................. C08J 9/00
[52] U.S. Cl. .............................. 521/79; 264/DIG. 5; 521/91; 521/143; 521/144; 521/149
[58] Field of Search ........................ 521/79, 143, 91; 264/DIG. 5

[56] References Cited

U.S. PATENT DOCUMENTS 3,511,787  5/1970  Bertorelli et al. ................. 521/91
3,855,160 12/1974  Shiotsu et al. .................... 521/91
3,939,237  2/1976  Naito et al. .................. 264/DIG. 5
3,959,197  5/1976  Salyer et al. ................ 264/DIG. 5
4,029,612  6/1977  Collington ......................... 521/91
4,065,401 12/1977  Cohnen et al. .................... 521/91

OTHER PUBLICATIONS

"Ency. of Chem. Tech.", Kirk–Othmer, (1966), 2nd Ed., vol. 10, pp. 541–544.

Primary Examiner—Morton Foelak

[57] ABSTRACT

Polyolefin foam having small, uniform cell size is prepared (1) by mixing a polyolefin resin with (a) a volatile organic blowing agent and (b) from about 0.1 to about 5 weight percent, based upon the polyolefin resin weight, of a cell control agent (e.g., such as amorphous silica having a pH of from 3.5 to 4.5), said cell control agent being in the form of nonporous microspheres having an average particle size of from about 5 to about 100 m$\mu$ and (2) by thereafter extrusion-expanding the resultant mixture.

6 Claims, 2 Drawing Figures

PROCESS FOR MANUFACTURING AN OLEFIN RESIN FOAM

Polyolefin resin foams, because of their closed-cell structure, flexibility and other features, have utility in a wide range of industrial applications such as for use as cushioning materials, etc. However, since the polyolefin resin is crystalline in nature, its cell size has not been easily controllable in the extrusion-expansion process. Generally, in manufacturing an extruded polyolefin resin foam, a small quantity of inorganic fine powder (such as talc) is added to a polyolefin resin before being extrusion-expanded into a foam in order to produce small, uniform cells. However, such fine powder of a conventional type is highly susceptible to conditions such as extrusion-expanding temperature, the quantity of a volatile blowing agent used and other factors and, thus, even the smallest fluctuations of these conditions in the extrusion-expanding process may cause the cell size to vary so remarkably that the resultant foam does not have a desired thickness and appearance. Also, it has been difficult to accurately correct or compensate varying factors and conditions. Further, it requires rather complicated operations and equipment to suitably control the quantity of the cell control agent correspondingly to the specific conditions involved for otherwise correcting or preventing the variation in the quality of the resultant foam. Besides, in such a method as cited immediately above, defective or unacceptable products produced until the quantity of the cell control agent is properly adjusted to the specific conditions may often amount to a large loss of product.

The present invention provides an improved process for manufacturing a polyolefin resin foam by adding to and mixing with a base polyolefin resin a cell control agent and a voltaile blowing agent and extrusion-expanding the resultant mixture in which process the cell control agent employed comprises amorphous silica having a pH of from 3.5 to 4.5 in the form of nonporous microspheres with an average particle size of from about 5 to about 100 m$\mu$ and wherein said amorphous silica is added in an amount in the range of from about 0.1 to about 5 percent by weight of the base polyolefin resin.

If the content of the amorphous silica cell control agent is lower than about 0.1 percent by weight or exceeds about 5.0 percent by weight, it is difficult to obtain a foamed product having small, uniform cells.

The pH of the unique cell control agent herein referred to is measured by the method in accordance with ASTM E-70-52T. Preferably the cell control agent contains at least 98 percent by weight of silicon dioxide.

The amorphous silica usable in the present invention is obtained by a method which is generally known as the dry process. The object of the present invention cannot be achieved by using porous, nonspherical silica such as that which is generally used in the art, nor by using silica having an average particle size outside the range of about 5 to about 100 m$\mu$. Moreover, such object is also difficult to obtain with any silica other than amorphous silica containing at least 98 percent by weight of silicon dioxide. The reason for this is not known, but this technical breakthrough may possibly be attributed to dispersibility of the cell control agent, the spherical surface conditions of the agent and compatibility of the volatile blowing agent with the base resin at the time when the resin, the blowing agent and the cell control agent are kneaded with each other within an extruder at a high temperature under high pressure.

To add the cell control agent of the present invention to the base resin, it may be either dryblended or masterbatched with the latter.

The polyolefin resin herein referred to includes, for example, low-density, medium-density and high-density polyethylene, polypropylene, polyethylene-propylene copolymer, polyethylene-vinyl acetate copolymer, polyethylene-acrylic acid copolymer and metal salts of polyethylene-acrylic acid copolymer. These may be used either singly or in mixture.

Useful volatile organic blowing agents include those having a boiling point equal to or lower than the Vicat softening point of the base resin as, for example, propane, butane, dichlorodifluoromethane, dichlorotetrafluoroethane, dichlorofluoromethane, trichlorofluoromethane, chlorodifluoroethane, difluoroethane and the like. These may be used either singly or in mixture. The use of chemical blowing agents is not desirable for the present invention because the proportion of closed cells in the extrusion-expanded foam will be lowered thereby.

The method of the present invention is applicable particularly advantageously to the manufacture of extruded foams having a density ranging from 15 to 100 kg/m$^3$. Also, in the method according to the present invention, known additives such as thermal stabilizers, lubricants, antistatic agents, flame retardants, etc. may be used in the normal fashion and in the conventionally employed amounts thereof (e.g., typically in the range of from about 0.1 to about 5 weight percent based upon the total composition weight).

The present invention is further described in detail by way of the preferred embodiments and comparative examples thereof, in which the cell control agents as listed in Table I below were used.

TABLE I

| Cell Control Agents in Trade Names | Manufacturer | Surface Profile | pH | SiO$_2$ Content (%) | Average particle size (m$\mu$) |
|---|---|---|---|---|---|
| Preferred Embodiments: | | | | | |
| Aerosil 300 | NIPPON AEROSIL CO., LTD. | Nonporous | 3.6 ~ 4.3 | 99.8< | Approx. 7 |
| Aerosil OX-50 | NIPPON AEROSIL CO., LTD. | Nonporous | 3.8 ~ 4.5 | 99.8< | Approx. 40 |
| Comparative Examples: | | | | | |
| Silene EF | FUJI TALC CO., LTD. | Porous | 9 ~ 10 | 64 | Approx. 30 |
| Bitasil 220 | TAGI FERTILIZER MANUFACTURING CO., LTD. | Porous | 8 ~ 9 | 81 ~ 85 | Approx. 30 |
| Silmos T | SHIRAISHI KOGYO KAISHA LTD. | Porous | 9 ~ 9.5 | 57.5 | Approx. 50 |

TABLE I-continued

| Cell Control Agents in Trade Names | Manufacturer | Surface Profile | pH | SiO₂ Content (%) | Average particle size (mμ) |
|---|---|---|---|---|---|
| Talc LMR | FUJI TALC CO., LTD. | Porous | 9 ~ 10 | 61.7 | Approx. 1 × 10³ |

Figure 2:
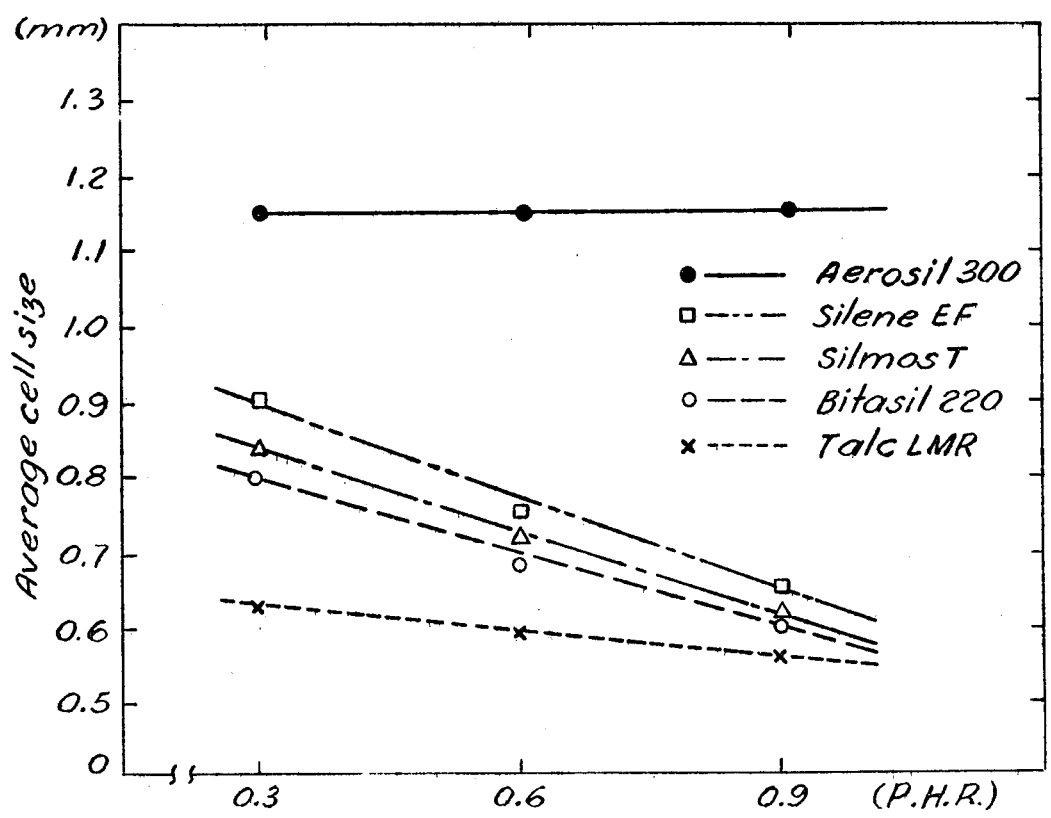

In the drawings, FIG. 1 is a chart plotting the average cell size obtained by a cell control agent of the present invention and by another cell control agent against the density thereof;

and FIG. 2 is a chart plotting the average cell size against the content of the specific cell control agents used.

Preferred Embodiment No. 1 and Comparative Example No. 1

100 Parts by weight of low-density polyethylene (F-2130 with MI of 3.0, produced by Asahi-Dow Limited), a varied amount of a volatile blowing agent, namely, 21~32 parts by weight of dichlorotetrafluoroethane, 0.3 part by weight of barium stearate as lubricant and 0.6 part by weight of Aerosil OX-50 or Talc LMR as a cell control agent were fed, respectively, into an extruder with an inside barrel diameter of 65 mm heated at 200° C. and evenly kneaded therein. The thus kneaded mixtures were cooled down to 100° C. by a cooler succeeding to the extruder, and then extruded into foams 2 mm thick, respectively. Properties and qualities of the resultant foams are summarized in Table II. Also, the average cell size of the resultant foams are plotted against the density thereof in FIG. 1.

As obviously understood from the observations of preferred embodiment No. 1 and comparative example No. 1 shown in Table II, the method of the present invention is much improved in that the average cell size of the resultant foam does not change even if the content of a volatile blowing agent is varied and, therefore, foamed sheets of consistent quality can be easily obtained according to the present invention.

Preferred Embodiment No. 2 and Comparative Example No. 2

Except that 24 parts by weight of chlorodifluoroethane were used as a volatile blowing agent instead of dichlorotetrafluoroethane, the same formulations as those of the preferred embodiment No. 1 and comparative example No. 1 were subjected to extrusion-expansion, respectively, in the same manner as in the preferred embodiment No. 1 and comparative example No. 1 but the extrusion-expansion temperature at a point just preceding to the circular die was set at three levels of 102° C., 104° C. and 106° C., respectively.

The resultant foams were 2 mm thick, respectively, and showed properties and qualities as summarized in Table III below. Table III also shows that, in the method according to the present invention, the average cell size of the resultant foam does not change even if the extrusion-expansion temperature is varied to a small extent and that foamed sheet of uniform quality can therefore be obtained even in spite of such extrusion-expansion temperature variations.

TABLE II

| Cell Control Agent | Density of foam (Kg/m³) | Average cell size (mm) | Quality of Foam |
|---|---|---|---|
| Preferred Embodiment No. 1: Aerosil OX-50 | 26.0 | 1.15 | No thickness variation, evenly distributed cells, good appearance |
| | 31.5 | 1.10 | No thickness variation, evenly distributed cells, good appearance |
| | 36.0 | 1.10 | No thickness variation, evenly distributed cells, good appearance |
| | 41.0 | 1.10 | No thickness variation, evenly distributed cells, good appearance |
| Comparative Example No. 1: Talc LMR | 26.0 | 0.1 or below | Heavy corrugate marks and thickness variation in lateral direction, uneven cell distribution, inferior appearance |
| | 33.5 | Approx. 0.62 | Heavy corrugate marks and thickness variation in lateral direction, uneven cell distribution, inferior appearance |
| | 35.0 | Approx. 0.82 | Light corrugate marks and thickness variation, rather uneven cell distribution and inferior appearance |
| | 41.0 | 1.19 | No corrugate mark or thickness variation, good appearance with evenly distributed cells |

TABLE III

| Cell Control Agent | Extrusion-expansion temperature (°C.) | Average cell size (mm) | Density (Kg/m³) | Quality of foam |
|---|---|---|---|---|
| Preferred Embodiment No. 2: Aerosil OX-50 | 102 | 1.13 | 35 | No thickness variation, evenly distributed cells, |

TABLE III-continued

| Cell Control Agent | Extrusion-expansion temperature (°C.) | Average cell size (mm) | Density (Kg/m$^3$) | Quality of foam |
| --- | --- | --- | --- | --- |
| | 104 | 1.15 | 36 | good appearance No thickness variation, |
| | 106 | 1.15 | 36 | evenly distributed cells, good appearance |
| Comparative Example No. 2: Talc LMR | 102 | 0.80 | 35 | Light corrugate mark and thickness variation in lateral direction, rather uneven cell distribution and inferior appearance |
| | 104 | 1.16 | 36 | No thickness variation, evenly distributed cells and good appearance |
| | 106 | 1.45 | 36 | No thickness variation, evenly distributed cells, but appearance lacked smooth feeling |

Preferred Embodiment No. 3 and Comparative Example No. 3

The same procedure as described in preferred embodiment No. 1 and comparative example No. 1 was repeated except that 24 parts by weight of dichlorodifluoroethane was used as volatile blowing agent and except that Aerosil 300, Bitasil 220, Silene EF, Silmos T and Talc LMT are added individually in the quantities of 0.3, 0.6 and 0.9 parts by weight to obtain mixtures for extrusion-expansion, without using any lubricant. The resultant foams showed properties as shown in FIG. 2, respectively. As obviously understood from the observations of the preferred embodiment No. 3 and comparative example No. 3 plotted in FIG. 2, the average cell size of the resultant foams is hardly affected by small variations in the quantity of a cell control agent as appearing in the preferred embodiment No. 3, so long as the unique cell control agent according to the present invention is used. In the observations as summarized in Table II and III and shown in FIGS. 1 and 2, cell sizes were measured on the cross-section of a foam magnified by 20 times and the algebric mean of their maximum diameters was given as their average cell size.

What is claimed is:

1. A process for manufacturing a polyolefin resin foam by adding to and mixing with a base polyolefin resin a cell control agent and a volatile organic blowing agent and extrusion-expanding the resultant mixture, said cell control agent comprising amorphous silica having a pH of from about 3.5 to about 4.5 in the form of nonporous microspheres with an average particle size of from about 5 to about 100 m$\mu$ and being employed in an amount of from about 0.1 to about 5 percent by weight of the base polyolefin resin.

2. The process for manufacturing a polyolefin resin foam according to claim 1, wherein a cell control agent comprises amorphous silica containing at least 98 percent by weight of silicon dioxide.

3. In a process for manufacturing a polyolefin resin foam by adding to and mixing with a base polyolefin resin a cell control agent and a volatile organic blowing agent and thereafter extrusion-expanding the resultant mixture; the improvement comprising the use as said cell control agent of from about 0.1 to about 5 weight percent, based upon the polyolefin resin weight, of nonporous microspheres of amorphous silica having an average particle size of from about 5 to about 100 m$\mu$ and having pH of from about 3.5 to about 4.5.

4. The process of claim 1 wherein the base polyolefin resin is selected from the group consisting of low density, medium density and high density polyethylenes, polypropylene, ethylene-propylene copolymers, ethylene-vinyl acetate copolymers, ethylene-acrylic acid copolymers and metal salts of ethylene-acrylic acid copolymers.

5. The process of claim 1, wherein the polyolefin is selected from the group consisting of polypropylene and low density, medium density and high density polyethylenes.

6. The process of claim 1 wherein the volatile organic blowing agent is selected from the group consisting of propane, butane, dichlorodifluoromethane, dichlorotetrafluoroethane, dichlorofluoromethane, trichlorofluoromethane, chlorodifluoroethane and difluoroethane.

* * * * *